(12) United States Patent
Wang

(10) Patent No.: US 9,537,345 B2
(45) Date of Patent: Jan. 3, 2017

(54) WIRELESS CHARGER AND CHARGING METHOD

(71) Applicant: FIH (Hong Kong) Limited, Kowloon (HK)

(72) Inventor: Chun-Nan Wang, New Taipei (TW)

(73) Assignee: FIH (Hong Kong) Limited, Kowloon (HK)

( * ) Notice: Subject to any disclaimer, the term of this patent is extended or adjusted under 35 U.S.C. 154(b) by 186 days.

(21) Appl. No.: 14/192,741

(22) Filed: Feb. 27, 2014

(65) Prior Publication Data

US 2014/0285159 A1 Sep. 25, 2014

(30) Foreign Application Priority Data

Mar. 19, 2013 (TW) .............................. 102109761 A

(51) Int. Cl.
*H02J 7/04* (2006.01)
*H02J 7/16* (2006.01)
*H02J 7/02* (2016.01)
*H02J 17/00* (2006.01)

(52) U.S. Cl.
CPC ................. *H02J 7/025* (2013.01); *H02J 17/00* (2013.01)

(58) Field of Classification Search
CPC ............ H02J 7/025; H02J 7/14; H02J 7/0068; H01F 38/14; Y02T 90/122; B60L 11/182; Y02E 60/12; H01M 10/441; H01M 10/44
USPC ......................................................... 320/162
See application file for complete search history.

(56) References Cited

U.S. PATENT DOCUMENTS

| | | | |
|---|---|---|---|
| 2005/0162131 A1* | 7/2005 | Sennami ............. | H01M 2/1022 320/128 |
| 2009/0033280 A1* | 2/2009 | Choi ...................... | H02J 7/025 320/108 |
| 2010/0194336 A1* | 8/2010 | Azancot .................. | G06F 1/26 320/108 |
| 2011/0156636 A1* | 6/2011 | Kim ....................... | H02J 7/0055 320/108 |
| 2011/0241615 A1* | 10/2011 | Yeh ......................... | H02J 7/025 320/108 |
| 2012/0146576 A1* | 6/2012 | Partovi .................. | H01F 7/0252 320/108 |

\* cited by examiner

*Primary Examiner* — Arun Williams
(74) *Attorney, Agent, or Firm* — Zhigang Ma

(57) ABSTRACT

A wireless charger charges an electronic device. The wireless charger receives radio frequency (RF) from a wireless power transmitter and generates alternating current (AC) electricity. The wireless charger coverts the AC electricity to direct current (DC) electricity and charges the electronic device using the DC electricity.

14 Claims, 5 Drawing Sheets

WIRELESS CHARGER AND CHARGING METHOD

BACKGROUND

1. Technical Field

Embodiments of the present disclosure relate to charging technology, and particularly to a wireless charger and a charging method using the wireless charger.

2. Description of Related Art

When an electronic device (e.g., a mobile phone) needs to be charged, a user may use a wired charger to connect to the electronic device and the wired charger can charge the electronic device. Still, improved methods of wirelessly charging the electronic device are desirable.

DETAILED DESCRIPTION

The disclosure is illustrated by way of examples and not by way of limitation in the figures of the accompanying drawings in which like references indicate similar elements. It should be noted that references to "an" or "one" embodiment in this disclosure are not necessarily to the same embodiment, and such references mean "at least one."

Figure 1:
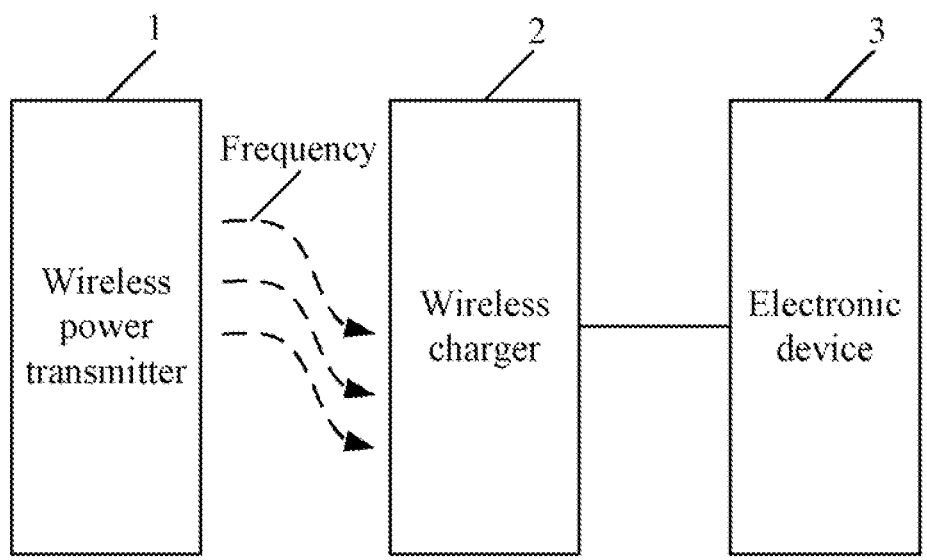
FIG. 1 is a schematic block diagram of one embodiment of a wireless charger.

FIG. 1 is a schematic block diagram of one embodiment of a wireless charger 2. Depending on the embodiment, the wireless charger 2 is wirelessly connected to a wireless power transmitter 1, and is wired to connect to an electronic device 3. The wireless power transmitter 1 is connected to an electricity network (e.g., power grid) to obtain the electricity. The wireless power transmitter 1 is used to generate radio frequency (RF) using the electricity and send the RF to the wireless charger 2. The wireless charger 2 receives the RF and generates electricity when the wireless charger 2 approaches to the wireless power transmitter 1 within a predetermined distance (e.g., one centimeter). Then the wireless charger 2 charges the electronic device 3 using the generated electricity. The wireless charger 2 may be embedded in the electronic device 3. For example, the wireless charger 2 may be a case to cover the electronic device 3. The electronic device 3 may be, but is not limited to, a mobile phone, a tablet computer, a personal digital assistant (PDA), or any other portable mobile electronic device.

Figure 2:
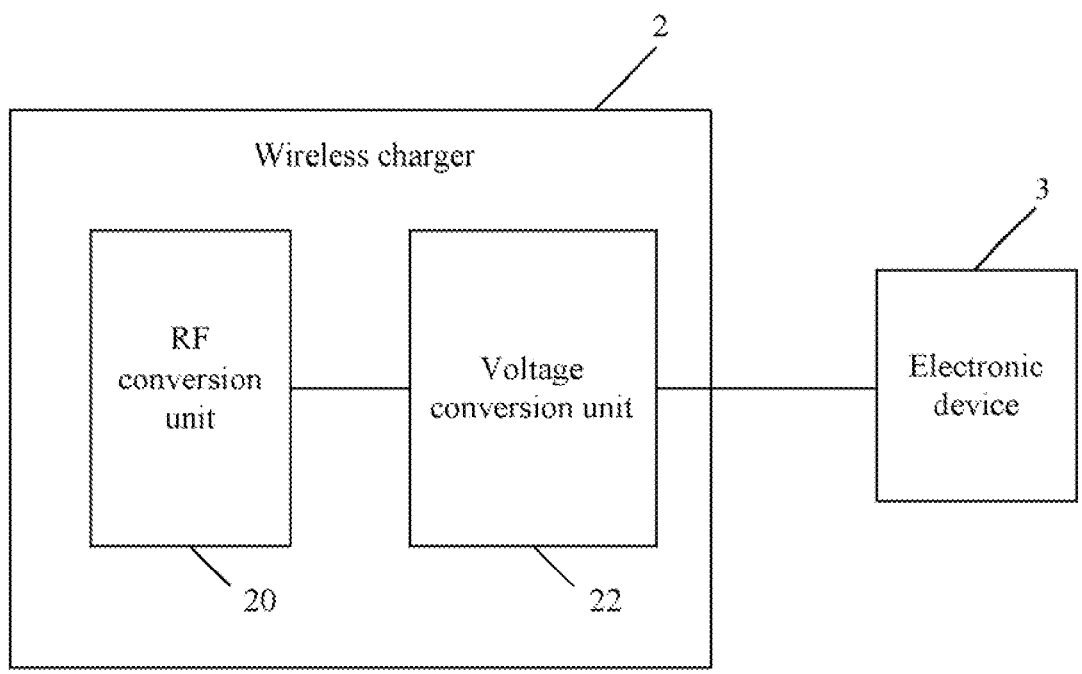
FIG. 2 is an isometric view of a first embodiment of the wireless charger in FIG. 1.

FIG. 2 is an isometric view of a first embodiment of the wireless charger 2 in FIG. 1. The wireless charger 2 includes a RF conversion unit 20 and a voltage conversion unit 22. The RF conversion unit 20 is connected to the voltage conversion unit 22, and the voltage conversion unit 22 is connected to the electronic device 3.

The RF conversion unit 20 receives the RF from the wireless power transmitter 1 and generates alternating current (AC) electricity. In one embodiment, the RF conversion unit 20 includes an induction coil. The voltage conversion unit 22 coverts the AC electricity to direct current (DC) electricity and charges the electronic device 3 using the DC electricity. In one embodiment, the voltage conversion unit 22 includes a rectifier. Additionally, the voltage conversion unit 22 stops charging the electronic device 3 when a built-in battery of the electronic device 2 is full.

Figure 3:
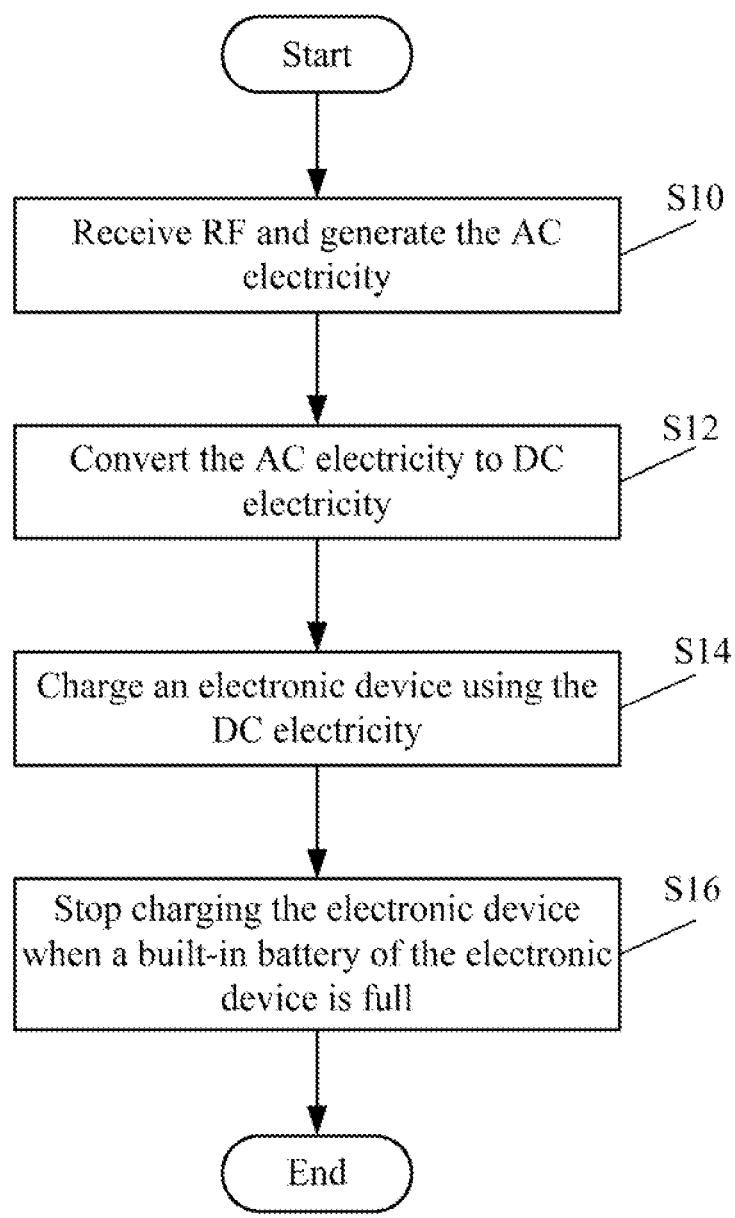
FIG. 3 is a flowchart illustrating one embodiment of a charging method implemented by the wireless charger in FIG. 2.

FIG. 3 is a flowchart illustrating one embodiment of a charging method implemented by the wireless charger 2 in FIG. 2. Depending on the embodiment, additional steps may be added, others deleted, and the ordering of the steps may be changed.

In step S10, the RF conversion unit 20 receives RF from the wireless power transmitter 1 and generates AC electricity. In one embodiment, the RF conversion unit 20 uses the induction coil to generate the AC electricity.

In step S12, the voltage conversion unit 22 converts the AC electricity to DC electricity. In one embodiment, the voltage conversion unit 22 enables the rectifier and converts the AC electricity to the DC electricity using the rectifier. Additionally, the voltage conversion unit 22 controls a voltage of the DC electricity to be equal to a charging voltage (e.g., 5.0 V) required by the electronic device 3.

In step S14, the voltage conversion unit 22 charges the electronic device 3 using the DC electricity.

In step S16, the voltage conversion unit 22 stops charging the electronic device 3 when the built-in battery of the electronic device 3 is full. In one embodiment, the voltage conversion unit 22 obtains a battery voltage of the built-in battery from the electronic device 3 and determines whether the battery voltage is equal to a specified value (e.g., 3.7 V). The specified value is required by the electronic device 3. The voltage conversion unit 22 determines that the built-in battery of the electronic device 3 is full, under the condition that the battery voltage is equal to the specified value. Additionally, the voltage conversion unit 22 sends commands to the RF conversion unit 20 and requests the RF conversion unit 20 to stop generating the AC electricity when the built-in battery of the electronic device 3 is full.

Figure 4:
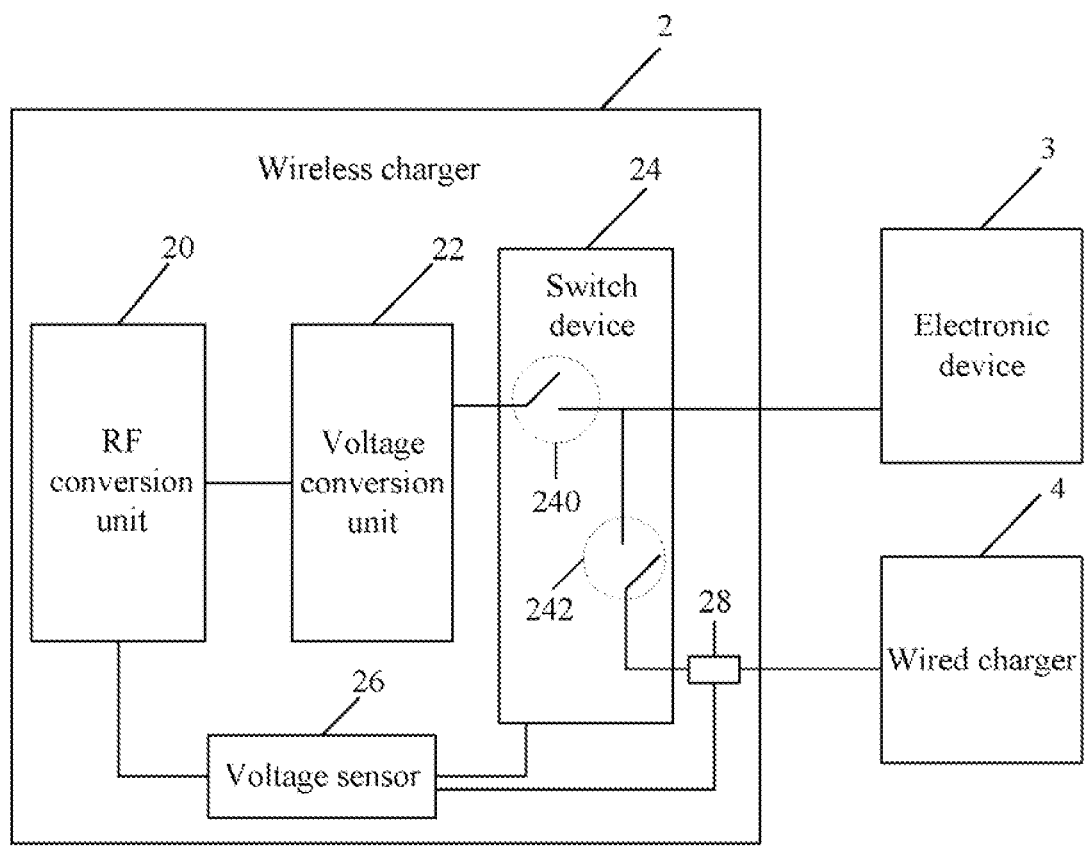
FIG. 4 is an isometric view of a second embodiment of the wireless charger in FIG. 1.

FIG. 4 is an isometric view of a second embodiment of the wireless charger in FIG. 1. The wireless charger 2 further includes a switch device 24, a voltage sensor 26 and an interface 28. The switch device 24 includes a first switch 240 and a second switch 242. The RF conversion unit 20 is connected to the voltage conversion unit 22. The voltage sensor 26 is connected to the RF conversion unit 20, the switch device 24 and the interface 28. The voltage conversion unit 22 is connected to the first switch 240, and the interface 28 is connected to the second switch 242 and the wired charger 4. The first switch 240 and the second switch are connected to the electronic device 3.

The RF conversion unit 20 receives RF from the wireless power transmitter 1 and generates AC electricity. In one embodiment, the voltage conversion unit 22 coverts the AC electricity to DC electricity and charges the electronic device 3 using the DC electricity.

The switch device 24 provides an option for a user to charge the electronic device 3 using the wireless charger 2 or the wired charger 4. In one embodiment, if the first switch 240 is turned on and the second switch 242 is turned off, the electronic device 3 is charged by the wireless charger 2. If the first switch 240 is turned off and the second switch 242 is turned on, the electronic device 3 is charged by the wired charger 4.

The voltage sensor 26 is used to check a voltage signal of the RF conversion unit 20 and the interface. In one embodiment, if a voltage signal is detected from the RF conversion unit 20, it is indicated that the electronic device 3 can be charged by the wireless charger 2. If a voltage signal is detected from? the interface 28, it is indicated that the electronic 3 can be charged by the wired charger 4. Additionally, in other embodiments, the voltage sensor 26 can control the switch device 24. In one embodiment, the voltage sensor 26 controls the first switch 240 to turn on and controls the second switch 242 to turn off, so that the electronic device 3 is charged by the wireless charger 2. The voltage sensor 26 can control the first switch 240 to turn off and the second switch 242 to turn on, so that the electronic device 3 is charged by the wired charger 4.

The voltage conversion unit 22 stops charging the electronic device 3 when the built-in battery of the electronic device 3 is full. In one embodiment, if the built-in battery of the electronic device 3 is full, the voltage sensor 26 controls the first switch 240 to turn off and controls the second switch 242 to turn off, so that the voltage conversion unit 22 cannot provide the DC electricity to the electronic device 3. Furthermore, the voltage conversion unit 22 controls the RF conversion unit 20 to stop generating the AC electricity.

Figure 5:
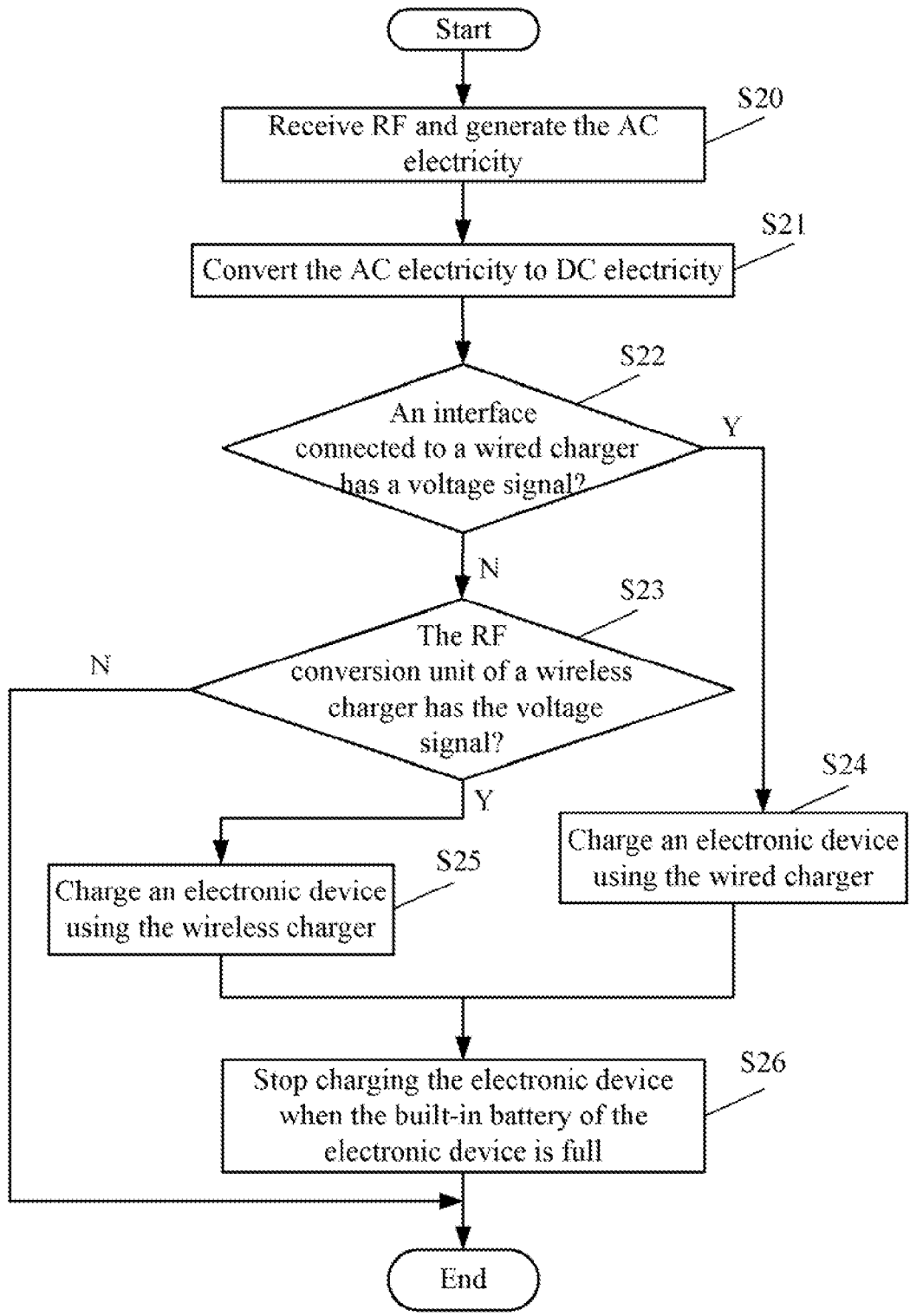
FIG. 5 is a flowchart illustrating one embodiment of a charging method implemented by the wireless charger in FIG. 4.

FIG. 5 is a flowchart illustrating one embodiment of a charging method implemented by the wireless charger 2 in FIG. 4.

In step S20, the RF conversion unit 20 receives RF from the wireless power transmitter 1 and generates AC electricity.

In step S21, the voltage conversion unit 22 converts the AC electricity to the DC electricity.

In step S22, the voltage sensor 26 determines whether any voltage signal is detected from the interface 28. If the interface 28 has the voltage signal, the procedure goes to step S24. Otherwise, if the interface 28 has no voltage signal, the procedure goes to step S23.

In step S23, the voltage sensor 26 determines whether any voltage signal is detected from the RF conversion unit 20. If the RF conversion unit 20 has the voltage signal, the procedure goes to step 25. Otherwise, if the RF conversion unit 20 has no voltage signal, the procedure ends.

In step S24, the voltage sensor 26 controls the first switch 240 to turn off and controls the second switch 242 to turn on, and the wired charger 4 charges electronic device 3.

In step S25, the voltage sensor 26 controls the first switch 240 to turn on and controls the second switch 242 to turn off, and the wireless charger 2 charges the electronic device 3.

In step S26, the voltage sensor 26 controls the first switch 240 to turn off and controls the second switch 242 to turn off when the built-in battery of the electronic device 3 is full.

Although certain inventive embodiments of the present disclosure have been specifiedally described, the present disclosure is not to be construed as being limited thereto. Various changes or modifications may be made to the present disclosure without departing from the scope and spirit of the present disclosure.

What is claimed is:

1. A wireless charger, comprising:
 a RF conversion unit that receives radio frequency (RF) from a wireless power transmitter wirelessly connected to the wireless charger and generates alternating current (AC) electricity; and
 a voltage conversion unit that is connected to the RF conversion unit and coverts the AC electricity to direct current (DC) electricity and charges an electronic device using the DC electricity, and the electronic device being wired to connect to the wireless charger;
 wherein the wireless charger further comprises:
 a switch device, a voltage sensor and an interface, the switch device comprising a first switch and a second switch;
 the voltage sensor being connected to the RF conversion unit, the switch device and the interface;
 the voltage conversion unit being connected to the first switch; and
 the interface being connected to the second switch and a wired charger;
 both of the first switch and the second switch being connected to the electronic device;
 wherein the voltage sensor controls the first switch to turn off and controls the second switch to turn on, and thus the wired charger charges electronic device; and alternately, the voltage sensor controls the first switch to turn on and controls the second switch to turn off, and thus the wireless charger charges the electronic device.

2. The wireless charger of claim 1, wherein the voltage conversion unit stops charging the electronic device when a built-in battery of the electronic device is full.

3. The wireless charger of claim 2, wherein the voltage conversion unit obtains a battery voltage of the built-in battery from the electronic device and determines that the built-in battery of the electronic device is full, under the condition that the battery voltage is equal to a specified value required by the electronic device.

4. The wireless charger of claim 2, wherein the voltage conversion unit requests the RF conversion unit to stop generating the AC electricity when the built-in battery of the electronic device is full.

5. The wireless charger of claim 1, wherein the voltage conversion unit comprises a rectifier and converts the AC electricity to the DC electricity using the rectifier.

6. The wireless charger of claim 1, wherein the RF conversion unit comprises an induction coil and generates the AC electricity using the induction coil.

7. The wireless charger of claim 1, wherein the voltage conversion unit controls a voltage of the DC electricity to be equal to a charging voltage required by the electronic device.

8. A non-transitory computer-based data charging method by a wireless charger, the method comprising:
 a RF conversion unit of the wireless charger that receives radio frequency (RF) from a wireless power transmitter wirelessly connected to the wireless charger and generates alternating current (AC) electricity; and
 a voltage conversion unit of the wireless charger that is connected to the RF conversion unit and coverts the AC electricity to direct current (DC) electricity and charges an electronic device using the DC electricity, and the electronic device being wired to connect to the wireless charger;
 wherein the wireless charger further comprises:
 a switch device, a voltage sensor and an interface, the switch device comprising a first switch and a second switch;
 the voltage sensor being connected to the RF conversion unit, the switch device and the interface;
 the voltage conversion unit being connected to the first switch;
 the interface being connected to the second switch and a wired charger; and
 both of the first switch and the second switch being connected to the electronic device;
 wherein the voltage sensor controls the first switch to turn off and controls the second switch to turn on, and thus the wired charger charges electronic device; and alternately, the voltage sensor controls the first switch to turn on and controls the second switch to turn off, and thus the wireless charger charges the electronic device.

9. The method of claim 8, wherein the voltage conversion unit stops charging the electronic device when a built-in battery of the electronic device is full.

10. The method of claim 9, wherein the voltage conversion unit obtains a battery voltage of the built-in battery from the electronic device and determines that the built-in battery of the electronic device is full, under the condition that the battery voltage is equal to a specified value required by the electronic device.

11. The method of claim 9, wherein the voltage conversion unit requests the RF conversion unit to stop generating the AC electricity when the built-in battery of the electronic device is full.

12. The method of claim 8, wherein the voltage conversion unit comprises a rectifier and converts the AC electricity to the DC electricity using the rectifier.

13. The method of claim 8, wherein the RF conversion unit comprises an induction coil and generates the AC electricity using the induction coil.

14. The method of claim 8, wherein the voltage conversion unit controls a voltage of the DC electricity to be equal to a charging voltage required by the electronic device.

\* \* \* \* \*